(12) United States Patent
Ohmori

(10) Patent No.: US 11,196,971 B2
(45) Date of Patent: Dec. 7, 2021

(54) ELECTRONIC APPARATUS, CONTROL METHOD OF THE SAME, AND STORAGE MEDIUM

(71) Applicant: CANON KABUSHIKI KAISHA, Tokyo (JP)

(72) Inventor: Shuichi Ohmori, Oyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 130 days.

(21) Appl. No.: 16/658,417

(22) Filed: Oct. 21, 2019

(65) Prior Publication Data

US 2020/0053331 A1    Feb. 13, 2020

Related U.S. Application Data

(63) Continuation of application No. PCT/JP2018/016148, filed on Apr. 19, 2018.

(30) Foreign Application Priority Data

Apr. 27, 2017 (JP) .............................. JP2017-088990

(51) Int. Cl.
*H04N 9/31* (2006.01)
*H04N 5/63* (2006.01)
*H04W 52/02* (2009.01)

(52) U.S. Cl.
CPC .............. *H04N 9/3194* (2013.01); *H04N 5/63* (2013.01); *H04W 52/02* (2013.01); *H04W 52/0216* (2013.01); *H04W 52/0258* (2013.01)

(58) Field of Classification Search
CPC ...... H04N 9/3194; H04N 5/63; H04N 9/3144; H04N 9/3158; H04N 21/443;
(Continued)

(56) References Cited

U.S. PATENT DOCUMENTS 5,857,906 A    1/1999  Cho
8,547,213 B2   10/2013 Ota
(Continued)

FOREIGN PATENT DOCUMENTS

JP    H09306673 A    11/1997
JP    H10047731 A     2/1998
(Continued)

OTHER PUBLICATIONS

Cheng, Wei-Chung, and Massoud Pedram. "Power minimization in a backlit TFT-LCD display by concurrent brightness and contrast scaling." IEEE Transactions on Consumer Electronics 50.1 (2004): 25-32. (Year: 2004).*

(Continued)

*Primary Examiner* — Sharad Rampuria
(74) *Attorney, Agent, or Firm* — Rossi, Kimms & McDowell LLP

(57) ABSTRACT

An electronic apparatus configured to wirelessly communicate with an external terminal includes a control unit configured to perform a first control for transferring the electronic apparatus from a standby state to an operating state, and a second control for instructing the electronic apparatus in the operating state to perform a specific operation, and a measurement unit configured to measure a communication time required for a wireless communication with the external terminal in the operating state and the standby state. The control unit sets a first threshold and a second threshold smaller than the first threshold as thresholds for the communication time, and performs the first control when the communication time is smaller than the first threshold in the standby state and the second control when the communication time is smaller than the second threshold in the operating state.

20 Claims, 12 Drawing Sheets

(58) Field of Classification Search
CPC ........... H04N 21/4432; H04N 21/4436; H04N 21/44218; H04N 21/436; H04W 76/10; H04W 84/18; H04W 88/06; H04W 52/0258; H04W 52/02; H04W 52/0216; Y02D 30/70; H04M 2250/02; H04M 1/00; H04M 1/72412; G03B 21/14; G09G 5/00; G09G 5/10
See application file for complete search history.

(56) References Cited

U.S. PATENT DOCUMENTS

| | | | |
|---|---|---|---|
| 9,298,246 B2 | 3/2016 | Kihara | |
| 2015/0084861 A1* | 3/2015 | Cheon | G06F 3/0482 345/156 |

FOREIGN PATENT DOCUMENTS

| | | |
|---|---|---|
| JP | 2002287723 A | 10/2002 |
| JP | 2007336227 A | 12/2007 |
| JP | 2008072561 A | 3/2008 |
| JP | 2010186312 A | 8/2010 |
| JP | 2010197440 A | 9/2010 |
| JP | 2010283449 A | 12/2010 |
| JP | 2014127740 A | 7/2014 |
| JP | 2014137553 A | 7/2014 |

OTHER PUBLICATIONS

Kang, Sungmuk, et al. "Zero standby power remote control system using light power transmission." IEEE transactions on Consumer Electronics 57.4 (2011): 1622-1627. (Year: 2011).*

English translation of Written Opinion issued in Intl. Appln. No. PCT/JP2018/016148 dated Jul. 24, 2018.

International Preliminary Report on Patentability issued in Intl. Appln. No. PCT/JP2018/016148 dated Nov. 7, 2019. English translation provided.

International Search Report issued in Intl. Appln. No. PCT/JP2018/016148 dated Jul. 24, 2018. English translation provided.

Written Opinion issued in Intl. Appln. No. PCT/JP2018/016148 dated Jul. 24, 2018.

* cited by examiner

ELECTRONIC APPARATUS, CONTROL METHOD OF THE SAME, AND STORAGE MEDIUM

CROSS-REFERENCE TO RELATED APPLICATIONS

This application is a Continuation of International Patent Application No. PCT/JP2018/016148, filed on Apr. 19, 2018, which claims the benefit of Japanese Patent Application No. 2017-088990, filed on Apr. 27, 2017, both of which are hereby incorporated by reference herein in their entirety.

BACKGROUND OF THE INVENTION

Field of the Invention

The present invention relates to an electronic apparatus that can wirelessly communicate with an external terminal.

Description of the Related Art

Some electronic apparatuses require a certain amount of time to start up from a standby or sleep state (or a state in which the main function is shut down) to an operating state (or a state in which the main function can exhibit a predetermined performance). It is necessary for a user who wishes to use such an electronic apparatus at a desired time to manually start up the electronic apparatus before the desired time, or to previously set the electronic apparatus so as to start it up before the desired time using a timer function.

A variety of electronic apparatuses have been disclosed for detecting a user near the electronic apparatus and for executing a specific function. An electronic apparatus (television) disclosed in Japanese Patent Laid-Open No. ("JP") 2014-127740 transmits image data to an external terminal according to an intensity of a radio wave from the external terminal carried by the user. An electronic apparatus (television) disclosed in JP 2008-072561 changes a size of a character to be displayed according to a detecting result of a user distance and the number of users using an infrared sensor and a camera. When it detects no user, it powers off. An electronic apparatus (lighting apparatus) disclosed in JP 9-306673 smoothly adjusts a color temperature of the lighting device in accordance with a received intensity of a wireless signal from an external terminal. An electronic apparatus (air conditioner) disclosed in JP 10-047731 controls a wind capacity and wind direction of an air conditioner based on whether there is a user in a room, a distance and position of the user relative to the air conditioner, and a result of detecting a user activity amount using an infrared sensor.

Any of the electronic apparatuses disclosed in the prior art references detect a near user through the radio wave intensity received from the external terminal carried by the user or the infrared sensor or camera. However, these determination methods may not execute the above specific functions, if there is an obstacle, such as a wall, between the electronic apparatus and the user, because the received radio wave intensity becomes weak or the infrared sensor or camera cannot detect the user.

SUMMARY OF THE INVENTION

The present invention provides an electronic apparatus, which can provide a specific function by stably detecting an approaching or leaving user, even if there is an obstacle between the electronic apparatus and the user (external terminal).

An electronic apparatus according to one aspect of the present invention is configured to wirelessly communicate with an external terminal. The electronic apparatus includes a control unit configured to perform a first control for transferring the electronic apparatus from a standby state to an operating state, and a second control for instructing the electronic apparatus in the operating state to perform a specific operation, and a measurement unit configured to measure a communication time required for a wireless communication with the external terminal in the operating state and the standby state. The control unit sets a first threshold and a second threshold smaller than the first threshold as thresholds for the communication time, and performs the first control when the communication time is smaller than the first threshold in the standby state and the second control when the communication time is smaller than the second threshold in the operating state.

An electronic apparatus according to another aspect is configured to wirelessly communicate with an external terminal. The electronic apparatus includes a control unit configured to perform a specific control for instructing the electronic apparatus in an operating state to perform a specific operation and a transfer control for transferring the electronic apparatus from the operating state to a standby state, and a measurement unit configured to measure a communication time required for a wireless communication with the external terminal in the operating state and the standby state. The control unit sets a third threshold and a fourth threshold that is larger than the third threshold as thresholds for the communication time, and performs the specific control when the communication time is larger than the third threshold, and the transfer control when the communication time is larger than the fourth threshold.

A control method of the above electronic apparatus and a storage medium storing a program that enables the computer to execute this control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
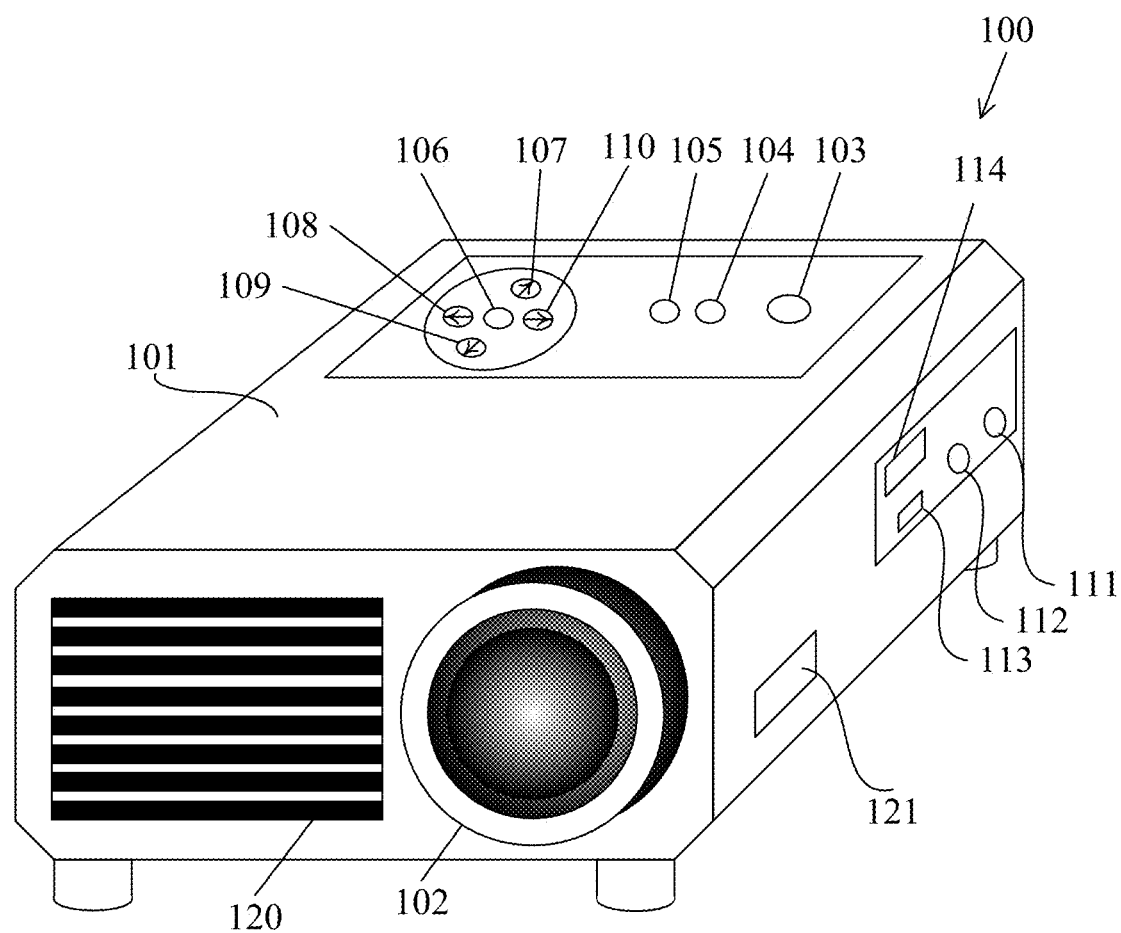
FIG. 1 is an overview of a projector according to first to fourth embodiments of the present invention.

FIG. 1 illustrates an appearance of an image projection apparatus (referred to as a projector hereinafter) 100 as an electronic apparatus according to a first embodiment of the present invention. In FIG. 1, reference numeral 101 denotes a main body (housing), and reference numeral 102 denotes a projection lens. The projection lens 102 has a zoom function and can select a size of an image to be projected. Reference numeral 103 denotes a power button, and reference numeral 104 denotes a menu button for displaying a menu screen for a variety of settings using an OSD (on-screen display) function. Reference numeral 105 denotes a button for selecting an input destination of the image signal, and reference numeral 106 denotes a button for selecting or determining in the menu screen. Reference numerals 107 to 110 are buttons for moving a menu to be selected on the OSD screen in one of up, down, left or right directions.

Reference numeral 111 denotes an audio input terminal, and reference numeral 112 denotes an audio output terminal. Reference numeral 113 denotes a digital image signal input terminal, and reference numeral 114 denotes an analog image signal input terminal. Reference numeral 121 denotes an AC power supply inlet, which is connected to an external commercial power supply via a cable. An ventilation opening 120 takes in external air for cooling the inside of the main body 101.

Figure 2:
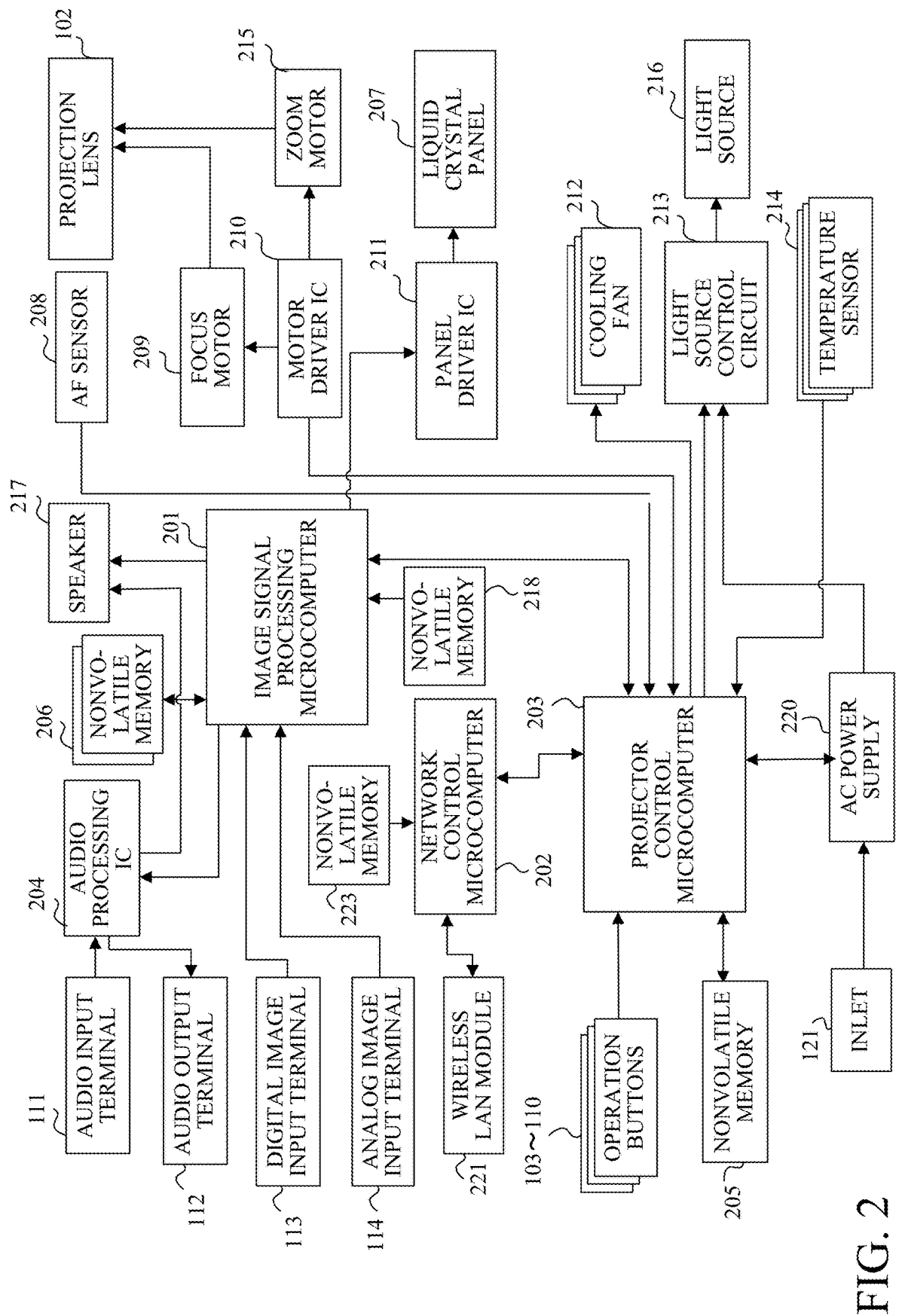
FIG. 2 is a block diagram showing a configuration of a projector according to the first to third embodiments.

FIG. 2 illustrates an electrical configuration of the projector 100 according to this embodiment. Reference numeral 201 denotes an image signal processing microcomputer, and performs resolution conversion processing and color correction processing described later for a digital or analog image signal input from an external image output device (not shown). When the image signal processing microcomputer 201 detects an image input from the digital image input terminal 113 or the analog image input terminal 114, the image signal processing microcomputer 201 performs decoding processing for the digital image signal and an A/D conversion processing for the analog image signal, and determines the resolution of the input image signal. Then, it performs conversion (scaling) processing into a resolution suitable for driving (display) of the liquid crystal panel 207 as a light modulation element for the image data generated by the decoding processing or the A/D conversion processing, and transmits the image data having a converted resolution to a liquid crystal panel driver 211. In addition, the image signal processing microcomputer 201 performs gamma correction, trapezoidal correction, and uneven color correction processing for the image data. The liquid crystal panel driver 211 drives the liquid crystal panel 207 in accordance with the received image data and control signal, and forms (displays) an original image on the liquid crystal panel 207. The liquid crystal panel 207 modulates the light from the light source 216 in accordance with the original image. The modulated light is projected by a projection lens 102 onto a projection surface, such as an unillustrated screen.

This embodiment describes a projector using a liquid crystal panel as a light modulation element as an example, but may use a light modulation element other than a liquid crystal panel, such as a digital micromirror device.

Reference numeral 203 denotes a projector control microcomputer that controls the operation of the projector 100 in accordance with an input from each of the operation buttons 103 to 110. The projector control microcomputer 203 controls lighting of the light source 216, such as a mercury lamp, via the light source control circuit 213, or a plurality of cooling fans 212 in accordance with the result of detecting the temperature in the main body 101 through the plurality of temperature sensors 214. When the projector control microcomputer 203 accepts an instruction to change the zoom state of the projection lens 102 through any of the operation buttons 107 to 110, the projector control microcomputer 203 changes the magnification of the projection lens 102 by driving the zoom motor 215 via the motor driver 210.

One or more of the plurality of temperature sensors 214 are attached to the periphery of the light source 216, and the projector control microcomputer 203 adjusts the air capacity of a plurality of cooling fans 212 to maintain the light source 216 at an appropriate temperature according to the temperature detected through the temperature sensor 214. Reference numeral 209 denotes a focus motor configured to adjust the focus state of the projection lens 102. The projector control microcomputer 203 calculates a lens adjustment amount to the focus position based on an output of the AF sensor 208, and drives the focus motor 209 via the motor driver 210.

A network control microcomputer 202 processes the data signal received from a wireless LAN module 221 that supports the wireless communication using WiFi Aware or the like, and converts it into a signal that can be processed by the projector control microcomputer 203.

In this embodiment, the wireless LAN module 221, the network control microcomputer 202, and the projector control microcomputer 203 are operable by receiving the DC power from an AC power supply 220, which will be described later, regardless of whether the projector 100 is in the operating state or the standby state. The operating state of the projector 100 is a state where the light source 216 is turned on and the image projection is performed (or image projection can be performed immediately). On the other hand, the standby state is a state where the light source 216 is turned off and the image projection is not (or is not able to be) performed.

The projector 100 can perform a wireless communication with an external control device such as a smartphone, a beacon terminal, or a personal computer through the wireless LAN module 221. The AC power source 220 generates a DC power supply used in the projector 100 from a commercial power source supplied via the inlet 121. A light source control circuit 213 receives a command from the projector control microcomputer 203 and generates a high voltage necessary for lighting the light source 216. Reference numerals 205, 218, and 223 denote nonvolatile memories, which store programs and setting data used by the connected microcomputer. Reference numeral 206 denotes a large-capacity volatile memory which is used as a frame buffer for a projection image and a calculation buffer for a microcomputer.

Reference numeral 204 denotes an audio processing IC that processes an audio signal input from the audio input terminal 111 or outputs an audio signal from the image signal processing microcomputer 201 to a speaker 217 or the audio output terminal 112.

Figure 3:
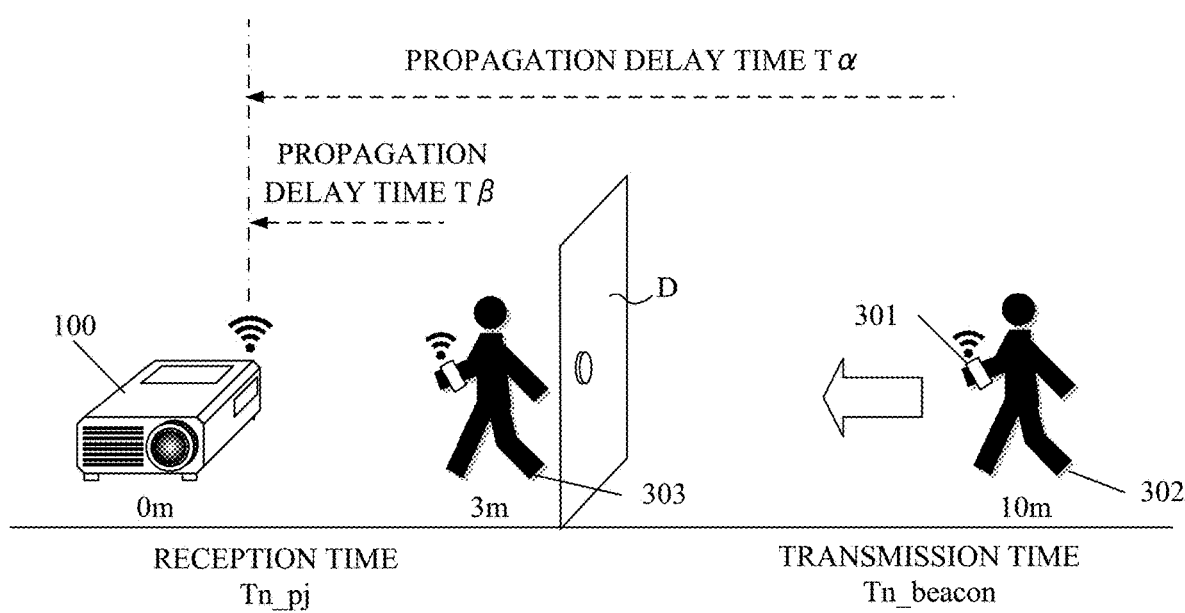
FIG. 3 illustrates the projector according to the first embodiment and the user.

FIG. 3 illustrates an illustrative positional relationship between the projector 100 according to this embodiment and the user. The projector 100 is installed in a room partitioned by an unillustrated wall and a door D viewed from a user 302 located at a position 10 m away from the projector 100 by a linear distance (simply referred to as a distance hereinafter). The user 302 carries a wireless LAN terminal 301 as an external terminal, and the wireless LAN terminal 301 periodically transmits a beacon signal to a variety of peripheral devices. Since the user 302 is located outside the door D viewed from the projector 100, the projector 100 cannot detect the user even if the projector 100 is provided with an infrared sensor or a camera.

The user 302 carrying the wireless LAN terminal 301 enters the room where the projector 100 is installed, from the position 10 m away. The user 303 entering the room is located 3 m away from the projector 100.

Figure 4:
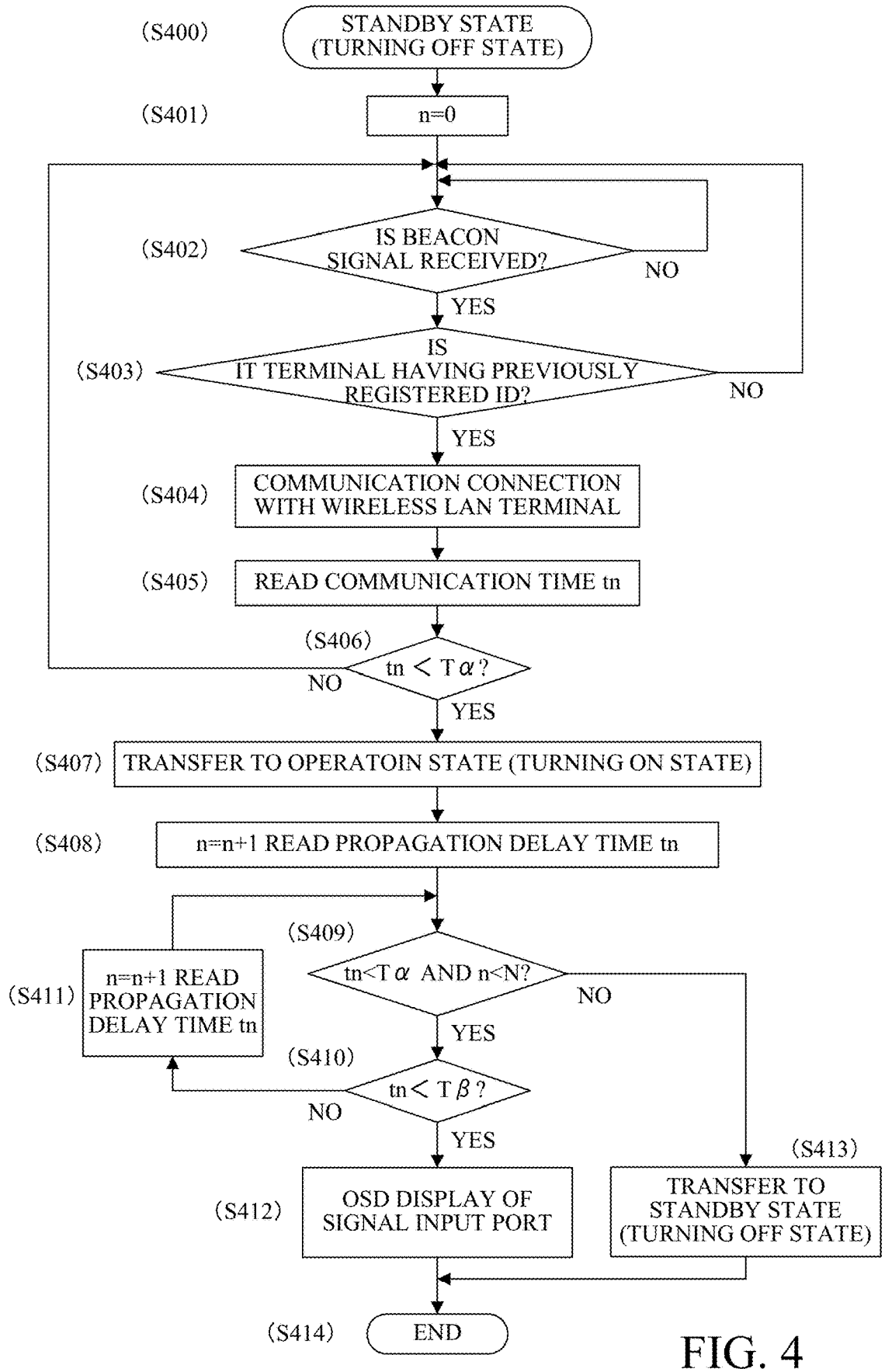
FIG. 4 is a flowchart showing processing performed by the projector according to the first embodiment.

FIG. 4 illustrates a flow of processing (control method) performed by the projector control microcomputer 203 as a control unit in response to the movement of the user 302 (303) illustrated in FIG. 3.

The projector control microcomputer 203 (simply referred to as the microcomputer 203 hereinafter) executes this processing in accordance with a projector control program that is a computer program. In FIG. 4 and the following description, S stands for the step (or process). These are the same in other embodiments described later.

At the start of this processing (S400), the user 302 is located 10 m away from the projector 100 outside the room, and the projector 100 in the room is in the standby state described above.

The microcomputer 203 that has started this processing sets an initial value (0) to the counter n in S401. Thereafter, the microcomputer 203 proceeds to S403 in response to receiving a beacon signal from the wireless LAN terminal 301 carried by the user 302 in S402. As described above, the projector 100 according to this embodiment can receive the beacon signal from the wireless LAN terminal 301 even in the standby state.

In S403, the microcomputer 203 determines whether identification information (ID) indicating the wireless LAN terminal 301 included in the received (acquired) beacon signal corresponds to one or more pieces of identification information (registered ID) registered in advance in the projector 100. If the two IDs do not match, the microcomputer 203 returns to S402, and if they match, the microcomputer 203 proceeds to the next S404.

In S404, the microcomputer 203 establishes a communication connection with the wireless LAN terminal 301 that has already been registered with the ID. Thereby, the wireless LAN module 221 receives the beacon signal transmitted from the wireless LAN terminal 301. Thereafter, in S405, the microcomputer 203 reads the radio wave propagation delay time to as the communication time required for the communication with the wireless LAN terminal 301 from the wireless LAN module 221 through the network control microcomputer 202. The wireless LAN module 221 corresponds to a measurement unit that measures the propagation delay time tn.

Now assume that the time when the wireless LAN terminal 301 carried by the user 302 transmits the beacon signal is Tn_beacon, and the time when the projector 101 receives the beacon signal from the wireless LAN terminal 301 is Tn_pj. Then, Tn_beacon is included as timestamp information in a wireless communication packet included in the beacon signal. The timestamp information indicates the elapsed time from the communication connection with the couterpart, and is different from the time representing the date and time. At this time, the propagation delay time tn is obtained by the following expression (1), where n is an integer.

$$tn = Tn\_pj - Tn\_beacon \quad (1)$$

The propagation delay time tn corresponds to a distance between the wireless LAN terminal 301 and the projector 100. Thus, the distance between the wireless LAN terminal 301 and the projector 100 can be estimated (measured) using the propagation delay time tn.

Next, in S406, the microcomputer 203 determines whether or not the propagation delay time tn is smaller than a threshold Tα as a first threshold. If the propagation delay time tn is smaller than the threshold Tα, the microcomputer 100 transfers the projector 100 from the standby state to the operating state in S407. (or performs the first control). In other words, the light source 216 is turned on to switch to a state in which the image projection is available. The threshold Tα is a time determined by the distance between the wireless LAN terminal 301 and the projector 100, and is a radio wave propagation delay time when the distance is 10 m in this embodiment. Hence, when the user 302 approaches to a position that is less than 10 m from the projector 100, the projector 101 transfers to the operating state. Then, the microcomputer 203 proceeds to S408.

On the other hand, if the propagation delay time tn is equal to or larger than the threshold Tα in S406 or if the user 302 is 10 m or more away from the projector 100, the microcomputer 203 returns to S402 to repeat the processing up to S406 again.

In S408, the microcomputer 203 increments the counter n by one and reads the propagation delay time tn again. In S409, the microcomputer 203 confirms whether the propagation delay time tn is smaller than the threshold Tα and the counter n is smaller than a threshold N. If the propagation delay time tn is smaller than the threshold Tα and the counter n is smaller than the threshold N, the microcomputer 203 proceeds to S410. On the other hand, if the propagation delay time tn is equal to or larger than the threshold Tα or the counter n is equal to or larger than the threshold N, the microcomputer 203 turns off the light source 216 in S413, transfers the projector 100 from the operating state to the standby state, and ends the process in S414.

In S410, the microcomputer 203 determines whether or not the propagation delay time tn is smaller than a threshold Tβ(<Tα) as a second threshold, and if it is smaller, the flow proceeds to S412. The threshold Tβ is also a time determined by the distance between the wireless LAN terminal 301 and the projector 100, and is a propagation delay time of the radio wave when the distance is 3 m in this embodiment. Hence, when the user 303 is closer to the projector 100 than 3 m, the microcomputer 203 proceeds to S412. On the other hand, if the propagation delay time tn is equal to or larger than the threshold Tβ, the microcomputer 203 proceeds to S411, and similar to S408, increments the counter n by one, reads the propagation delay time tn again, and proceeds to the determination in S409.

In S412, the microcomputer 203 displays an image input terminal which is currently receiving an image or a type (digital/analog, resolution, etc.) of an input image signal on the projection screen by the OSD function. In other words, the image input display function which is a specific operation is displayed (second control is performed). The user 303 who has seen this display can determine whether or not the projector 100 is in an operating state and a desired image signal is input to the projector 100 (whether or not the image projection can be immediately started). Thereafter, the microcomputer 203 ends this process in S414.

This embodiment notifies the user that the projector 100 is in an operating state by the display in S412, but may notify him by an audio output from the speaker 217. In other words, the audio output by an audio output function may be performed instead.

Second Embodiment

Next follows a description of a projector according to a second embodiment of the present invention. The external appearance and electrical configuration of the projector according to this embodiment are the same as those of the first embodiment described with reference to FIGS. 1 and 2.

Figure 5:
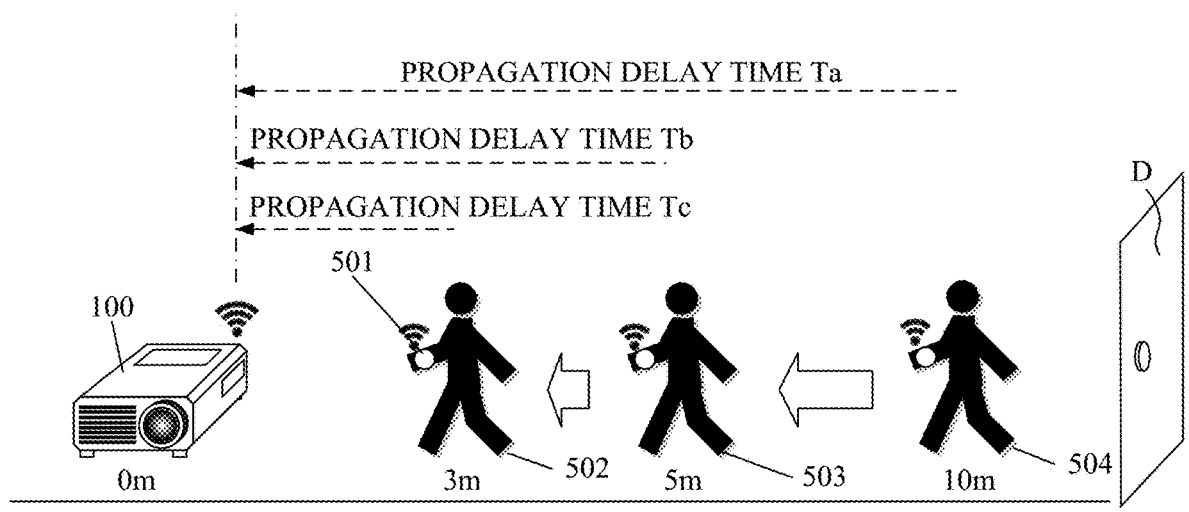
FIG. 5 illustrates the projector according to the second embodiment and the user.

FIG. 5 illustrates an illustrative positional relationship between the projector 100 according to this embodiment and the user. The projector 100 is installed in a room having an unillustrated wall and a door D. Reference numeral 504 denotes a user who is located 10 m away from the projector 100 in the same room, reference numeral 503 denotes a user who has approached to a position away from the projector 100 by a distance of 5 m, and reference numeral 502 denotes a user who has approached to a position away from the projector 100 by a distance of 3 m. The user 504 (503, 502) carries a wireless LAN terminal 501, and the wireless LAN terminal 501 periodically transmits a beacon signal to a variety of peripheral devices.

Figure 6A:
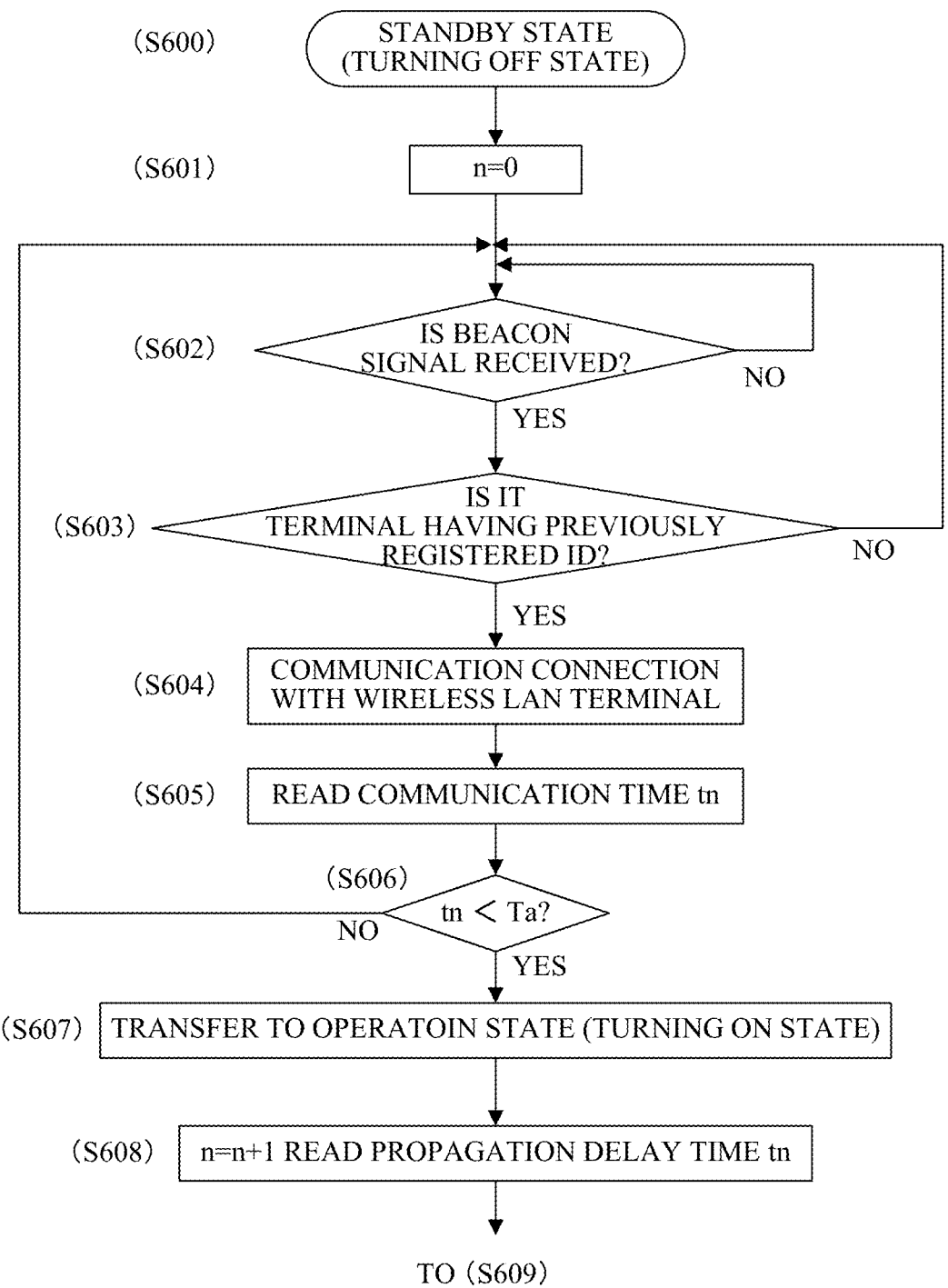
FIGS. 6A and 6B are flowcharts of processing performed by the projector according to the second embodiment.
Figure 6B:
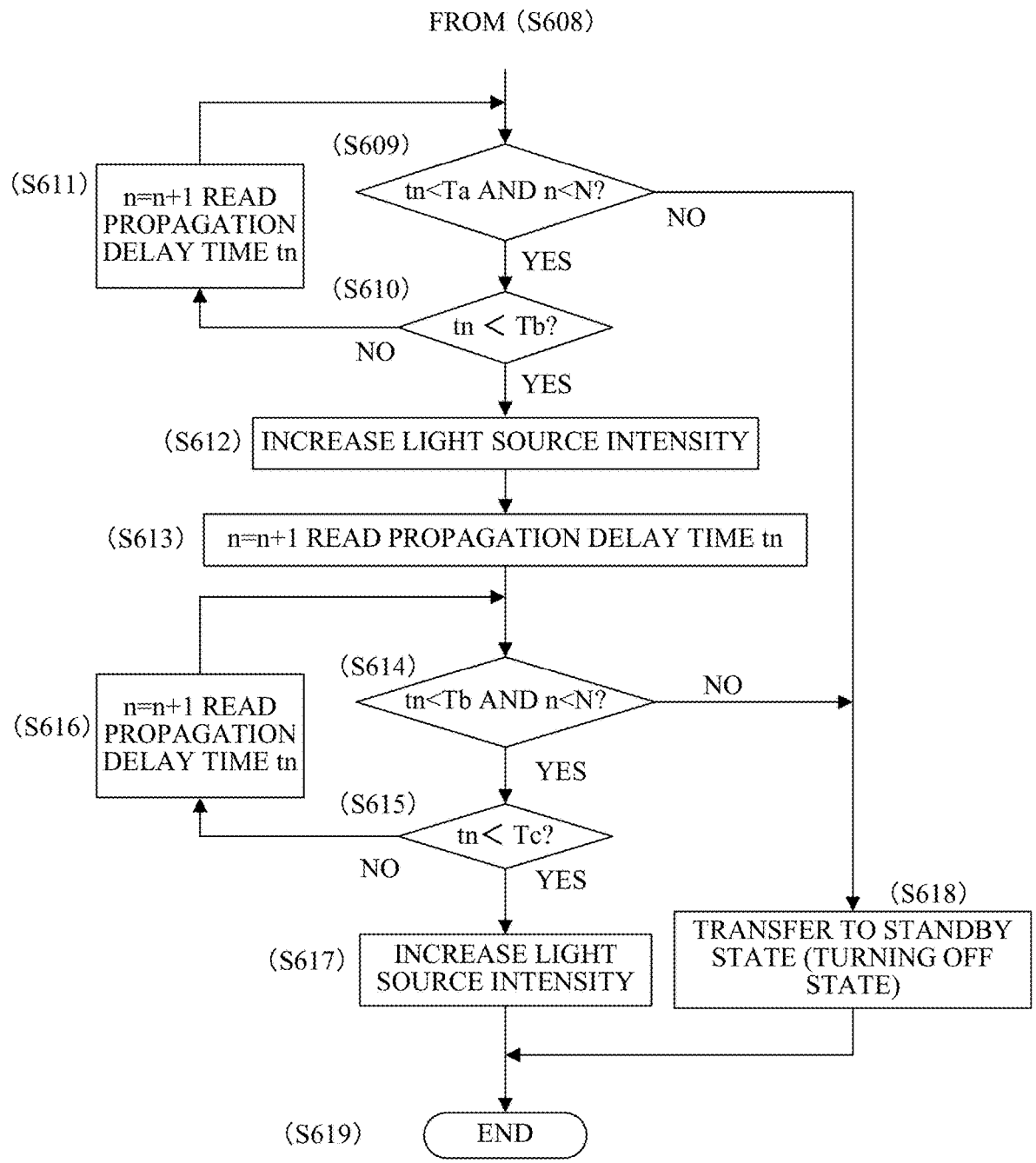

FIGS. 6A and 6B illustrate a flow of processing (control method) performed by the microcomputer 203 in response to the movement of the user 504 (503, 502) illustrated in FIG. 5. At the start of this process (S600), the user 504 is located at a position away from the projector 100 by 10 mm, and the projector 100 is in a standby state.

The processing of S601 to S605 is the same as the processing of S401 to S405 in the first embodiment (FIG. 4). In this embodiment, the user 302 in the first embodiment is replaced with the user 504, and the wireless LAN terminal 301 is replaced with the wireless LAN terminal 501.

In S606, the microcomputer 203 determines whether or not the propagation delay time tn is smaller than the threshold Ta as the first threshold, and if it is smaller, in S607 the projector 100 is transferred from the standby state to the operating state. In other words, the light source 216 is turned on to switch to a state in which the image projection is available. At this time, the light emission intensity of the light source 216 is set to the first light emission intensity that provides a luminance considerably lower than the luminance on the projection surface (screen or the like) when the normal image projection is performed. The threshold Ta is a time determined by the distance between the wireless LAN terminal 501 and the projector 100, and a radio wave propagation delay time when the distance is 10 m. Thus, when the user 504 approaches to a position that is less than 10 m from the projector 100, the projector 101 transfers to the operating state. Thereafter, the microcomputer 203 proceeds to S608.

On the other hand, if the propagation delay time tn is equal to or larger than the threshold Ta in S606 or if the user 504 is 10 m or more away from the projector 100, the microcomputer 203 returns to S602 and repeats the processing up to S606 again.

In S608, the microcomputer 203 increments the counter n by one and reads the propagation delay time tn again. In S609, the microcomputer 203 confirms whether the propagation delay time tn is smaller than the threshold Ta and whether the counter n is smaller than the threshold N. If the propagation delay time tn is smaller than the threshold Ta and the counter n is smaller than the threshold N, the microcomputer 203 proceeds to S610. On the other hand, if the propagation delay time tn is equal to or larger than the threshold Ta or the counter n is equal to or larger than the threshold N, the microcomputer 203 turns off the light source 216 in S618, transfers the projector 100 from the operating state to the standby state, and ends the process in S619.

In S610, the microcomputer 203 determines whether or not the propagation delay time tn is smaller than a threshold Tb as a second threshold (<Ta), and if it is smaller, the flow proceeds to S612. The threshold Tb is also a time determined by the distance between the wireless LAN terminal 501 and the projector 100, and is a radio wave propagation delay time when the distance is 5 m in this embodiment. Hence, when the user 503 approaches to a position that is less than 5 m from the projector 100, the microcomputer 203 proceeds to S612. On the other hand, if the propagation delay time tn is equal to or larger than the threshold Tb, the microcomputer 203 proceeds to S611, increments the counter n by one, reads the propagation delay time tn again, similar to S608, and proceeds to the determination in S609.

In S612, the microcomputer 203 increases the light emission intensity of the light source 216 to a second light emission intensity higher than the first light emission intensity at the time of lighting in S606 (or performs the second control). The operation to increase the emission intensity of the light source 216 corresponds to a specific operation. The second light emission intensity is set so as to acquire the luminance slightly lower than the luminance on the projection surface in the normal image projection and higher than the luminance at the time of lighting in S606. Then, the flow proceeds to S613.

In S613, the microcomputer 203 counts up the counter n by one similar to S608, and reads the propagation delay time tn again. In S614, the microcomputer 203 confirms whether the propagation delay time tn is smaller than the threshold Tb and whether the counter n is smaller than the threshold N. If the propagation delay time tn is smaller than the threshold Tb and the counter n is smaller than the threshold N, the microcomputer 203 proceeds to S615. On the other hand, if the propagation delay time tn is equal to or larger than the threshold Tb or the counter n is equal to or larger than the threshold N, the microcomputer 203 turns off the light source 216 in S618, transfers the projector 100 from the operating state to the standby state, and ends the process in S619.

In S615, the microcomputer 203 determines whether or not the propagation delay time tn is smaller than a threshold Tc (<Tb), and if it is smaller, the flow proceeds to S617. The threshold Tc is also a time determined by the distance between the wireless LAN terminal 501 and the projector 100, and is a radio wave propagation delay time when the distance is 3 m in this embodiment. Hence, when the user 502 approaches to a position that is less than 3 m from the projector 100, the microcomputer 203 proceeds to S615. On the other hand, if the propagation delay time tn is equal to or larger than the threshold Tc, the microcomputer 203 proceeds to S616, increments the counter n by one, reads the propagation delay time tn again, similar to S608, and proceeds to the determination in S614.

In S617, the microcomputer 203 further increases the light emission intensity of the light source 216 from the second light emission intensity in S612. The light emission intensity herein is set so as to acquire the luminance on the projection surface for the normal image projection. Then, the microcomputer 203 proceeds to S619 and ends this process.

This embodiment discusses the three set thresholds Ta, Tb, and Tc for the propagation delay time, but the thresholds Tb and Tc can be summarized as a second threshold smaller than the first threshold Ta. Whenever the propagation delay time is smaller than the threshold Tb and the threshold Tc, this embodiment stepwise increases the light emission intensity of the light source 216 from the first light emission intensity.

Third Embodiment

Next follows a description of a projector according to a third embodiment of the present invention. The external appearance and electrical configuration of the projector according to this embodiment are the same as those of the first embodiment described with reference to FIGS. 1 and 2.

Figure 7:
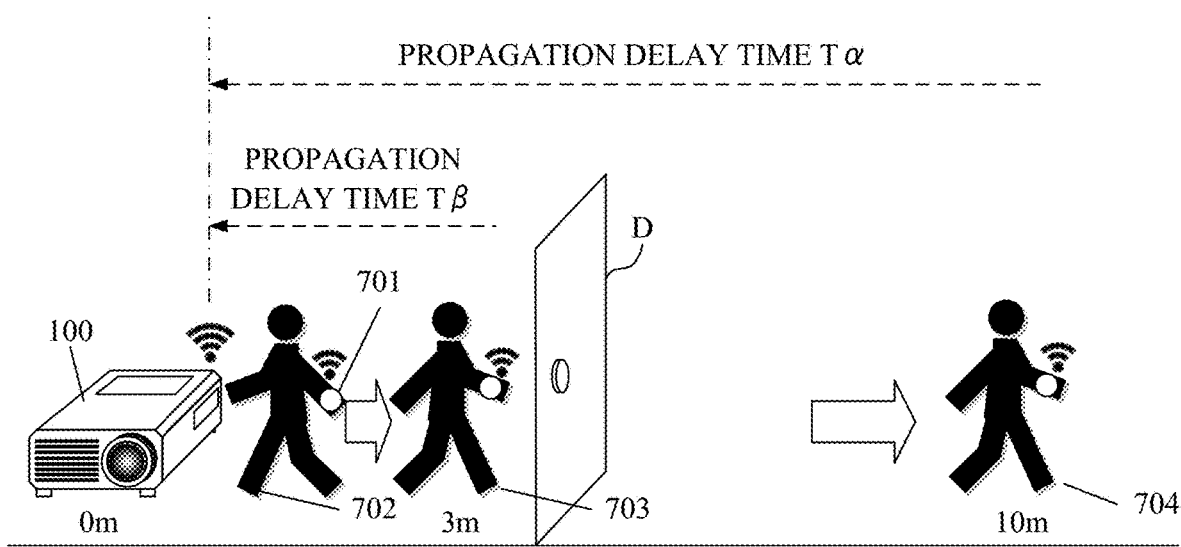
FIG. 7 illustrates the projector according to the third embodiment and the user.

FIG. 7 illustrates an illustrative positional relationship between the projector 100 according to this embodiment and the user. The projector 100 is installed in a room having an unillustrated wall and a door D. Reference numeral 702 denotes a user near the projector 100 in the room, reference numeral 703 denotes a user away from the projector 100 in the room by a distance of 3 m, and reference numeral 704 denotes a user outside the room through the door D and away from the projector by a distance of 10 m. The user 702 (703, 704) carries a wireless LAN terminal 701, and the wireless LAN terminal 701 periodically transmits a beacon signal to a variety of peripheral devices.

Figure 8:
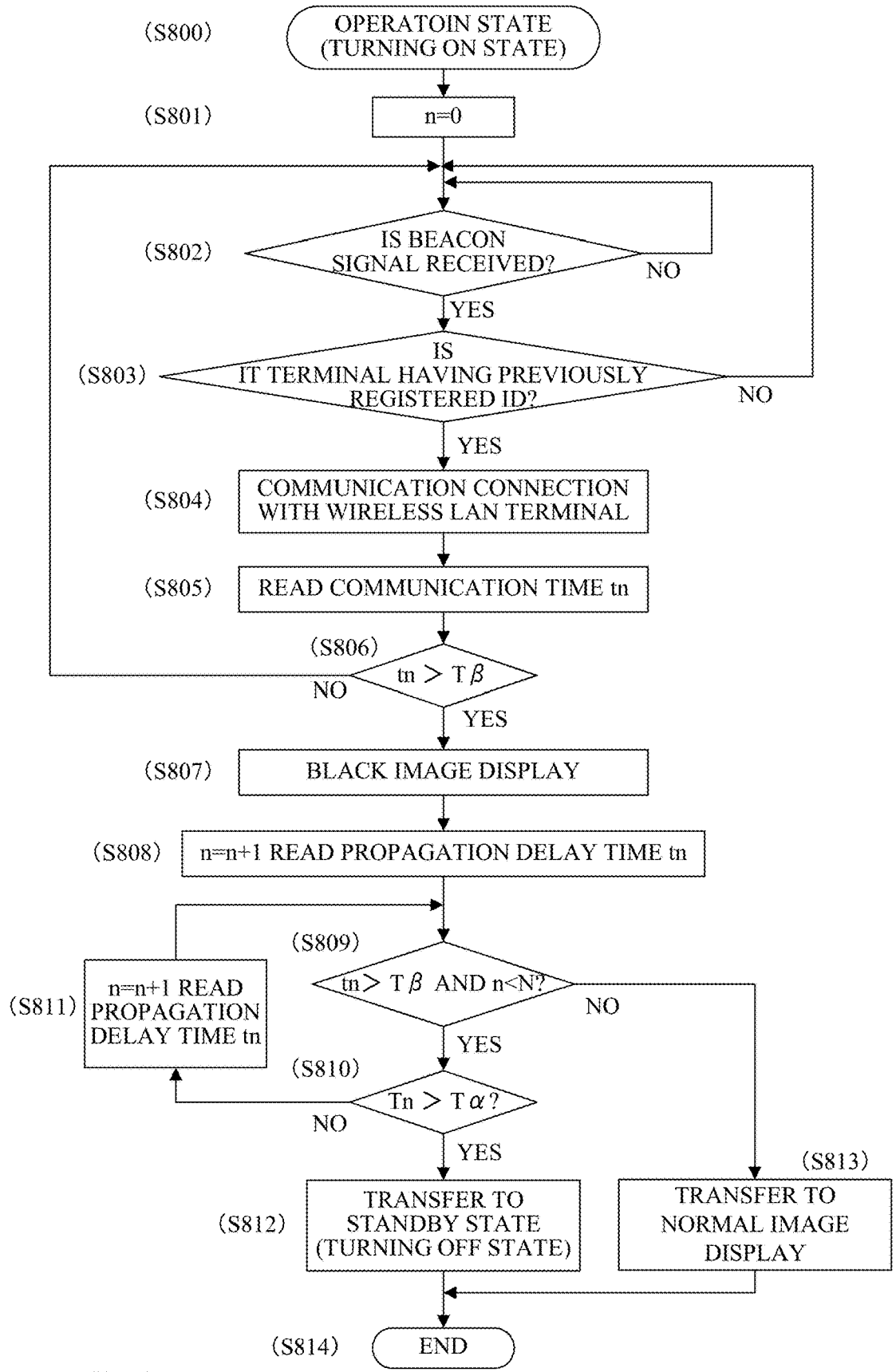
FIG. 8 is a flowchart showing processing performed by the projector according to the third embodiment.

FIG. 8 illustrates a flow of processing (control method) performed by the microcomputer 203 in response to the movement of the user 702 (703, 702) illustrated in FIG. 7. At the start of this processing (S800), the user 702 is located near the projector 100, and the projector 100 is in an operating state and performs the normal image projection in accordance with the input image signal.

The processing of S801 to S805 is the same as the processing of S401 to S405 in the first embodiment (FIG. 4). In this embodiment, the user 302 in the first embodiment is replaced with the user 702, and the wireless LAN terminal 501 is replaced with the wireless LAN terminal 701.

In S806, the microcomputer 203 determines whether or not the propagation delay time to is larger than a threshold Tβ as a third threshold. If the propagation delay time tn is larger than the threshold Tβ, the microcomputer 203 instructs the projector 100 to project an all-black image as a specific image regardless of the input image signal (perform the third or specific control) in S807. In other words, a specific image display function provides a display as a specific operation. The threshold Tβ is a time determined by the distance between the wireless LAN terminal 701 and the projector 100, and is a radio wave propagation delay time when the distance is 3 m in this embodiment. Hence, when the user 703 moves away from the projector 100 by more than 3 m, the projector 101 projects the all-black image. Thereafter, the microcomputer 203 proceeds to S808.

On the other hand, if the propagation delay time tn is equal to or smaller than the threshold Tβ in S806 or if the user 504 stays within 3 m from the projector 100, the microcomputer 203 returns to S802 and repeats the processing up to S806 again.

In S808, the microcomputer 203 increments the counter n by one and reads the propagation delay time tn again. In S809, the microcomputer 203 confirms whether the propagation delay time tn is larger than the threshold Tβ and the counter n is smaller than the threshold N. If the propagation delay time tn is larger than Tβ and the counter n is smaller than the threshold N, the microcomputer 203 proceeds to S810. On the other hand, if the propagation delay time tn is equal to or smaller than Tβ or the counter n is equal to or larger than the threshold N, the microcomputer 203 switches from the state in which the all-black image is displayed in S813 to the state in which normal image projection is performed, and ends the process in S814.

In S810, the microcomputer 203 determines whether or not the propagation delay time tn is larger than a threshold Tα (>Tβ) as a fourth threshold, and if it is larger, proceeds to S812. The threshold Tα is also a time determined by the distance between the wireless LAN terminal 701 and the projector 100, and is a radio wave propagation delay time when the distance is 10 m in this embodiment. Hence, when the user 704 moves away from the projector 100 by more than 10 m, the microcomputer 203 proceeds to S812. On the other hand, if the propagation delay time tn is less than or equal to the threshold Tα, the microcomputer 203 proceeds to S811, increments the counter n by one, reads the propagation delay time tn again, similar to S808, and proceeds to the determination in S809.

In S812, the microcomputer 203 transfers the projector 100 from the operating state to the standby state (performs the fourth or transfer control), turns off the light source 216, and ends the process in S814.

Fourth Embodiment

Next follows a description of a projector according to a fourth embodiment of the present invention. The external appearance and electrical configuration of the projector according to this embodiment are the same as those of the first embodiment described with reference to FIGS. 1 and 2.

Figure 9:
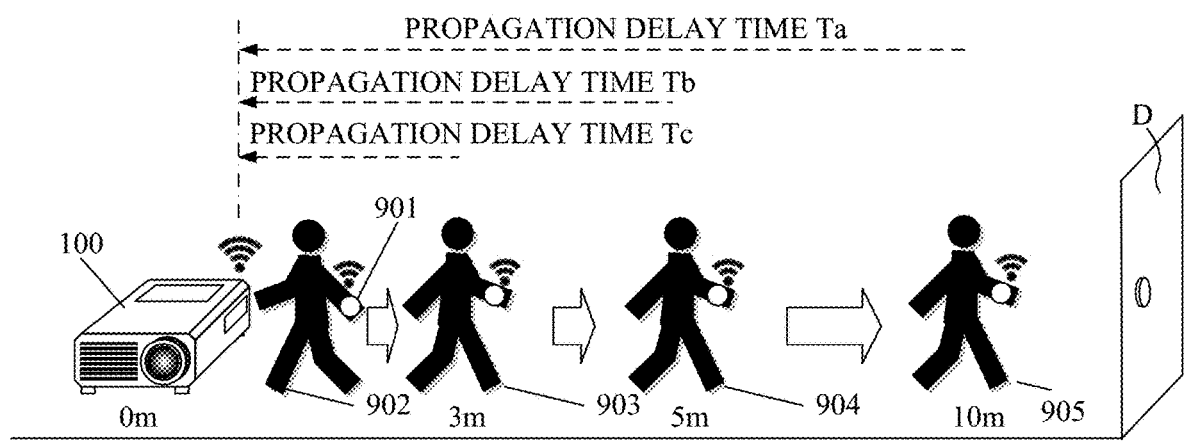
FIG. 9 illustrates the projector according to the fourth embodiment and the user.

FIG. 9 illustrates an illustrative positional relationship between the projector 100 of this embodiment and the user. The projector 100 is installed in a room having an unillustrated wall and a door D. Reference numeral 902 denotes a user near the projector 100 in the room, reference numeral 903 denotes a user away from the projector 100 by a distance of 3 m in the room, and reference numeral 904 denotes a user away from the projector by 5 m in the room. Reference numeral 905 denotes a user away from the projector by a distance of 10 m in the room. The user 902 (903 to 905) carries a wireless LAN terminal 901, and the wireless LAN terminal 901 periodically transmits a beacon signal to a variety of peripheral devices.

Figure 10A:
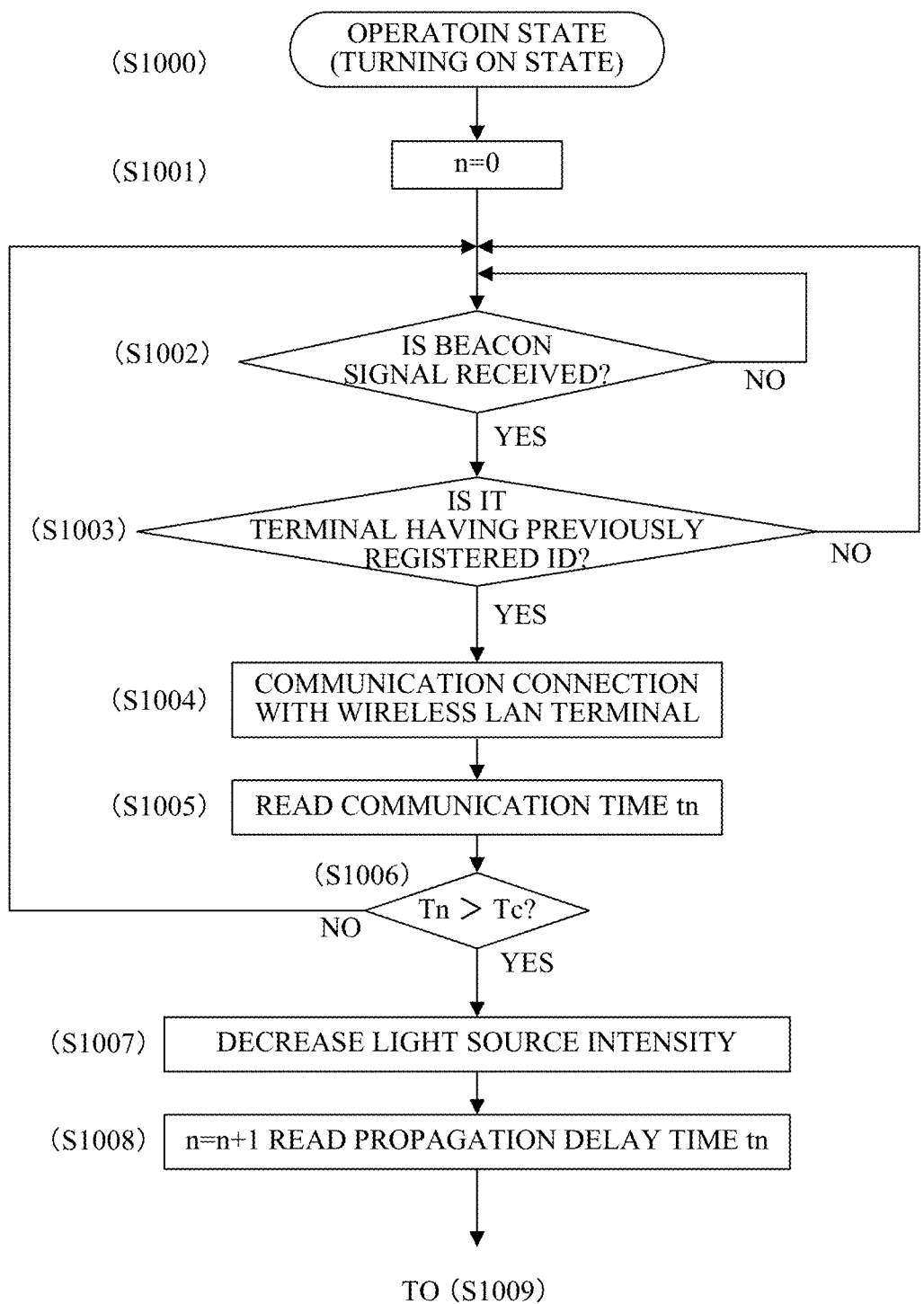
FIGS. 10A and 10B are flowcharts showing processing performed by the projector according to the fourth embodiment.
Figure 10B:
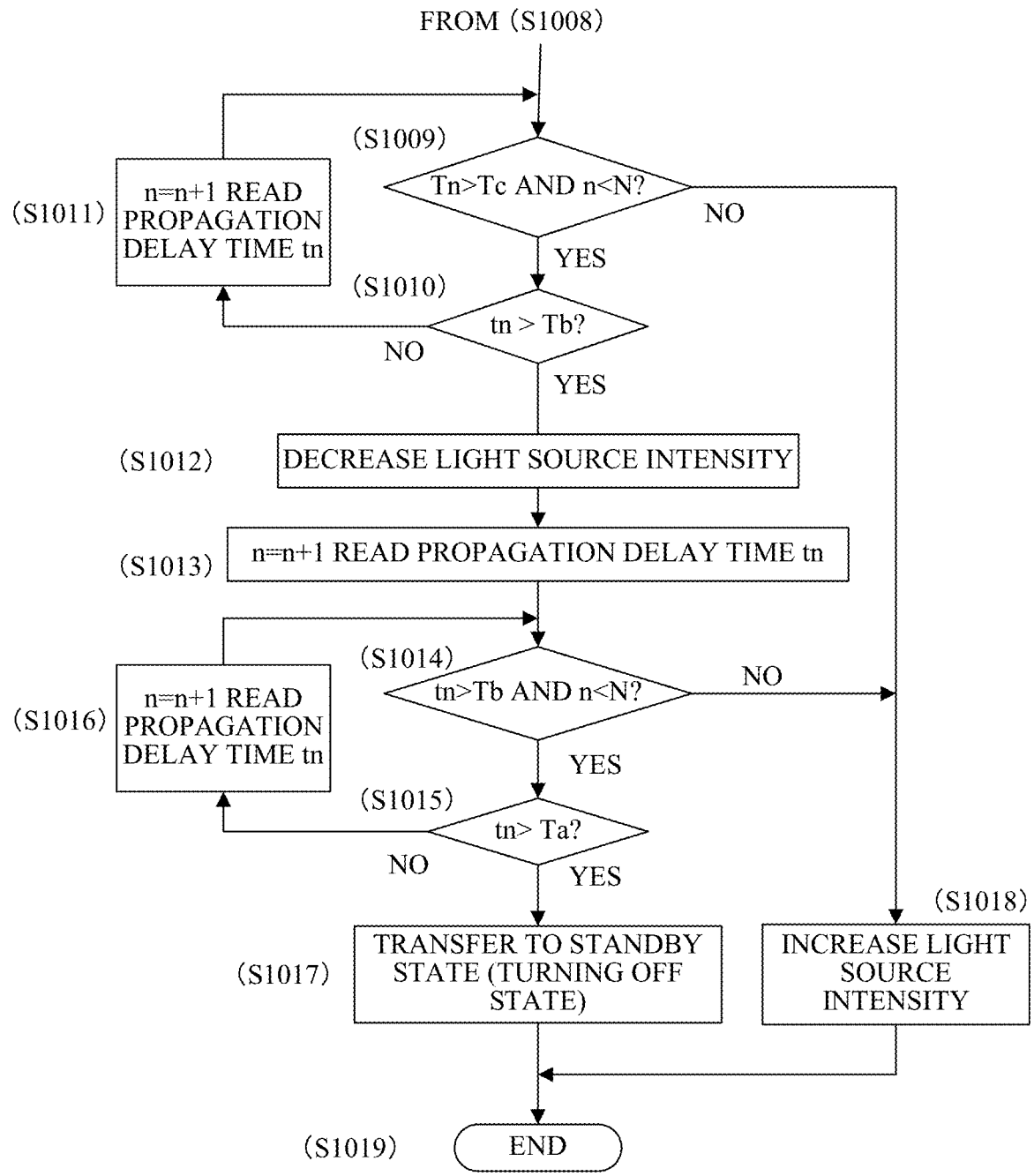

FIGS. 10A and 10B illustrate a flow of processing (control method) performed by the microcomputer 203 in response to the movement of the user 902 (903 to 905) illustrated in FIG. 9. At the start of this process (S1000), the user 902 is located near the projector 100, and the projector 100 is in an operating state and performs the normal image projection in accordance with the input image signal.

The processing of S1001 to S1005 is the same as the processing of S401 to S405 in the first embodiment (FIG. 4). In this embodiment, the user 302 in the first embodiment is replaced with the user 902, and the wireless LAN terminal 301 is replaced with the wireless LAN terminal 901.

In S1006, the microcomputer 203 determines whether or not the propagation delay time tn is larger than a threshold Tc as a third threshold. If the propagation delay time tn is larger than the threshold Tc, the microcomputer 203 in S1007 sets the light emission intensity of the light source 216 to a fourth light emission intensity slightly lower than the third light emission intensity used for normal image projection in S1000 (or performs the third or specific control). Reducing the light emission intensity corresponds to a specific operation.

The threshold Tc is a time determined by the distance between the wireless LAN terminal 901 and the projector 100, and is a propagation delay time of radio waves when the distance is 3 m in this embodiment. Thus, when the user 903 moves away from the projector 100 by more than 3 m, the microcomputer 203 proceeds to S1007.

On the other hand, when the propagation delay time tn is equal to or smaller than the threshold Tc or when the user 902 stays within 3 m from the projector 101, the microcomputer 203 returns to S1002 and repeats the processing up to S1006 again.

In S1008, the microcomputer 203 increments the counter n by one and reads the propagation delay time tn again. In S1009, the microcomputer 203 confirms whether the propagation delay time tn is larger than the threshold Tc and the counter n is smaller than the threshold N. If the propagation delay time tn is larger than the threshold Tc and the counter n is smaller than the threshold N, the microcomputer 203 proceeds to S1010. On the other hand, if the propagation delay time tn is equal to or smaller than the threshold Tc or the counter n is equal to or larger than the threshold N, the microcomputer 203 proceeds to S1018, increases the light emission intensity of the light source 216 from the fourth light emission intensity reduced in S1007, and sets the third emission intensity for the normal image projection. In S1019, the process ends.

In S1010, the microcomputer 203 determines whether or not the propagation delay time tn is larger than the threshold Tb (>Tc), and if it is larger, the process proceeds to S1012. The threshold Tb is also a time determined by the distance between the wireless LAN terminal 901 and the projector 100, and is a radio wave propagation delay time when the distance is 5 m in this embodiment. Hence, when the user 904 moves away from the projector 100 by more than 5 m, the microcomputer 203 proceeds to S1012. On the other hand, if the propagation delay time tn is equal to or smaller than the threshold Tb, the microcomputer 203 proceeds to S1011, increments the counter n by one, reads the propagation delay time tn again similar to S1008, and proceeds to the determination in S1009.

In S1012, the microcomputer 203 further lowers the light emission intensity of the light source 216 from the light emission intensity reduced in S1007. In S1013, the microcomputer 203 increments the counter n by one, reads the propagation delay time tn again similar to S1008, and proceeds to S1014.

In S1014, the microcomputer 203 confirms whether the propagation delay time tn is larger than the threshold Tb and the counter n is smaller than the threshold N. If the propagation delay time tn is larger than the threshold Tb and the counter n is smaller than the threshold N, the microcomputer 203 proceeds to S1015. On the other hand, if the propagation delay time tn is equal to or smaller than the threshold Tb or the counter n is equal to or larger than the threshold N, the microcomputer 203 proceeds to S1018, increases the light emission intensity of the light source 216 from the light emission intensity reduced in S1012, and sets it to the third emission intensity for the normal image projection. In S1019, the process ends.

In S1015, the microcomputer 203 determines whether or not the propagation delay time tn is larger than a threshold Ta as the fourth threshold (>Tb), and if it is larger, proceeds to S1017. The threshold Ta is also a time determined by the distance between the wireless LAN terminal 901 and the projector 100, and is a radio wave propagation delay time when the distance is 10 m in this embodiment. Hence, when the user 905 moves away from the projector 100 by more than 10 m, the microcomputer 203 proceeds to S1017. On the other hand, if the propagation delay time tn is equal to or smaller than the threshold Ta, the microcomputer 203 proceeds to S1016, increments the counter n by one, reads the propagation delay time tn again similar to S1008, and proceeds to the determination in S1014.

In S1017, the microcomputer 203 transfers the projector 100 from the operating state to the standby state (performs the fourth or transfer control), turns off the light source 216, and ends this processing in S1019.

This embodiment has described the three thresholds Tc, Tb, and Ta set for the propagation delay time, but the thresholds Tb and Ta can be summarized as a fourth threshold longer than the third threshold Tc. Whenever the propagation delay time becomes larger than the threshold Tb and the threshold Ta, this embodiment stepwise reduces the light emission intensity of the light source 216 from the third light emission intensity.

As described above, in accordance with the propagation delay time tn measured in one of the operating state and the standby state, the microcomputer 203 in each embodiment transfers the projector 100 from the one state to the other state. Thereby, even if there is an obstacle, such as a wall or a door, between the projector 100 and the wireless LAN terminal (user), the approaching or leaving user can be stably detected, and the transfer between the operating state and standby state of the projector can be well controlled.

The first to fourth embodiments have described the user carrying the wireless LAN terminal but rather, even when another wireless communication terminal such as Bluetooth (registered trademark) is carried, the projector can be controlled similar to the first to fourth embodiments. The above embodiments describe a projector as an illustrative electronic apparatus. However, the same control as that in each of the first to fourth embodiments is applicable using a wireless communication terminal to a variety of other electronic apparatuses configured to transfer between the standby state (light source turning on state) and the operating state (light source turning off state), such as streetlamps and large-scale lighting devices used in an event venue, gymnasium, etc.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processor (CPU), microprocessor (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention provides an electronic apparatus that can provide a specific function by stably detecting an approaching or leaving user even if there is an obstacle between the electronic apparatus and the user (external terminal).

What is claimed is:

1. An electronic apparatus configured to wirelessly communicate with an external terminal, the electronic apparatus comprising:
    a control unit configured to perform a first control for transferring the electronic apparatus from a standby state to an operating state, and a second control for instructing the electronic apparatus in the operating state to perform a specific operation; and
    a measurement unit configured to measure a communication time required for a wireless communication with the external terminal in the operating state and the standby state,
    wherein the control unit sets a first threshold and a second threshold smaller than the first threshold as thresholds for the communication time, and performs the first control when the communication time is smaller than the first threshold in the standby state and the second control when the communication time is smaller than the second threshold in the operating state.

2. The electronic apparatus according to claim 1, wherein the communication time is a time period from when a beacon signal is transmitted from the external terminal to when the electronic apparatus receives the beacon signal.

3. The electronic apparatus according to claim 1, further comprising a light source,
    wherein the standby state is a state where the light source is turned off, and
    wherein the operating state is a state where the light source is turned on.

4. The electronic apparatus according to claim 3, wherein the electronic apparatus is an image projection apparatus configured to project light by modulating light from the light source by a light modulation element.

5. The electronic apparatus according to claim 1, further comprising a light source configured to switch a light emission intensity between a first light emission intensity and a second light emission intensity higher than the first light emission intensity,
    wherein the control unit performs the first control and turns on the light source at the first emission intensity when the communication time is smaller than the first threshold in the standby state, and the second control to switch the light emission intensity to the second light emission intensity when the communication time is smaller than the second threshold in the operating state.

6. The electronic apparatus according to claim 1, further comprising a plurality of image input terminals, and the electronic apparatus having an image input display function for displaying one of the plurality of image input terminals which is receiving an image or a type of an input image signal, and
    wherein the control unit performs the second control so as to instruct the electronic apparatus to display the image input display function.

7. The electronic apparatus according to claim 1, further comprising a speaker and has an audio output function for outputting an audio from the speaker,
    wherein the control unit performs the second control so as to instruct the electronic apparatus to output the audio by the audio output function.

8. The electronic apparatus according to claim 1, wherein the control unit performs at least one of the first control and the second control in accordance with the communication time when identification information acquired from the external terminal corresponds to with registered identification information.

9. An electronic apparatus configured to wirelessly communicate with an external terminal, the electronic apparatus comprising:
    a control unit configured to perform a specific control for instructing the electronic apparatus in an operating state to perform a specific operation and a transfer control for transferring the electronic apparatus from the operating state to a standby state; and
    a measurement unit configured to measure a communication time required for a wireless communication with the external terminal in the operating state and the standby state,
    wherein the control unit sets a third threshold and a fourth threshold that is larger than the third threshold as thresholds for the communication time, and performs the specific control when the communication time is larger than the third threshold, and the transfer control when the communication time is larger than the fourth threshold.

10. The electronic apparatus according to claim 9, wherein the communication time is a time period from when a beacon signal is transmitted from the external terminal to when the electronic apparatus receives the beacon signal.

11. The electronic apparatus according to claim 9, further comprising a light source,
    wherein the standby state is a state where the light source is turned off, and
    wherein the operating state is a state in which the light source is turned on.

12. The electronic apparatus according to claim 11, wherein the electronic apparatus is an image projection apparatus configured to project light by modulating light from the light source with a light modulation element.

13. The electronic apparatus according to claim 9, further comprising a light source configured to switch a emission intensity between a third emission intensity and a fourth emission intensity lower than the third emission intensity,
    wherein when the communication time is larger than the third threshold where the light source is turned on at the third light emission intensity, the control unit performs the specific control so as to switch the light emission intensity to the fourth light emission intensity.

14. The electronic apparatus according to claim 9, wherein the electronic apparatus can display a specific image regardless of an input image signal, and wherein the control unit performs the specific control so as to display the specific image.

15. The electronic apparatus according to claim 9, wherein the control unit performs at least one of the specific control and the transfer control in accordance with the communication time when identification information acquired from the external terminal corresponds to with registered identification information.

16. The electronic apparatus according to claim 1, wherein a wireless communication is performed using a wireless LAN or Bluetooth (registered trademark).

17. A control method of an electronic apparatus configured to wirelessly communicate with an external terminal, the control method comprising the steps of:
  measuring a communication time required for a wireless communication with the external terminal in the operating state and standby state of the electronic apparatus; and
  setting a first threshold and a second threshold smaller than the first threshold as thresholds for the communication time, performing a first control for transferring the electronic apparatus from the standby state to the operating state when the communication time is smaller than the first threshold in the standby state, and a second control for instructing the electronic apparatus in the operating state to perform a specific operation when the communication time is smaller than the second threshold in the operating state.

18. A control method of an electronic apparatus configured to wirelessly communicate with an external terminal, the control method comprising the steps of:
  measuring a communication time required for a wireless communication with the external terminal in the operating state and standby state of the electronic apparatus;
  setting a third threshold and a fourth threshold that is larger than the third threshold as thresholds for the communication time, performing a specific control for instructing the electronic apparatus in the operating state to perform a specific operation when the communication time is larger than the third threshold, and a transfer control for transferring the electronic apparatus from the operating state to the standby state when the communication time is larger than the fourth threshold.

19. A non-transitory computer readable storage medium storing a computer program for causing a computer of an electronic apparatus capable of wireless communication with an external terminal to execute the control method according to claim 17.

20. A non-transitory computer readable storage medium storing a computer program for causing a computer of an electronic apparatus capable of wireless communication with an external terminal to execute the control method according to claim 18.

* * * * *